United States Patent

[11] 3,530,834

| [72] | Inventors | Charles J. Hollenback<br>4304 W. South St.;<br>Loren J. Freund, 3505 W. Ringwood Road,<br>McHenry, Illinois 60050 |
|---|---|---|
| [21] | Appl. No. | 726,888 |
| [22] | Filed | May 6, 1968 |
| [45] | Patented | Sept. 29, 1970 |

[54] ANIMAL SUSPENSION RACK
5 Claims, 6 Drawing Figs.

[52] U.S. Cl. .................................... 119/96,
17/44, 119/97
[51] Int. Cl. .................................... A62b 35/00,
A61d 3/00
[50] Field of Search .......................... 119/103,
96, 97; 17/11, 17, 44

[56] References Cited
UNITED STATES PATENTS

| 557,453 | 3/1896 | Thompson.................. | 269/140 |
| 1,721,581 | 7/1929 | Young........................ | 119/97 |
| 3,188,130 | 6/1965 | Pietrowicz.................. | 17/44X |
| 3,250,251 | 5/1966 | Geary........................ | 119/103X |

FOREIGN PATENTS

| 458,261 | 7/1949 | Canada | 119/103 |

*Primary Examiner*—Aldrich F. Medbery
*Attorney*—Martin Faier

ABSTRACT: An animal suspension rack comprising an upstanding standard, a clamping device for holding an animal in extended position at the upper end of the standard, foot pedals for locking and unlocking the clamping device, and a base for the standard.

Patented Sept. 29, 1970
3,530,834
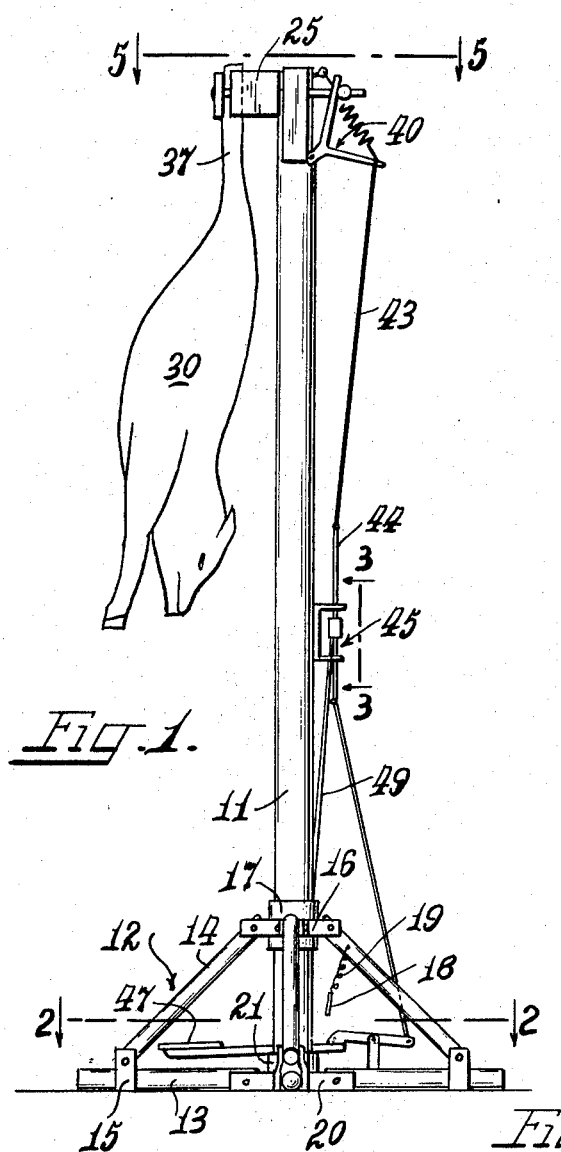
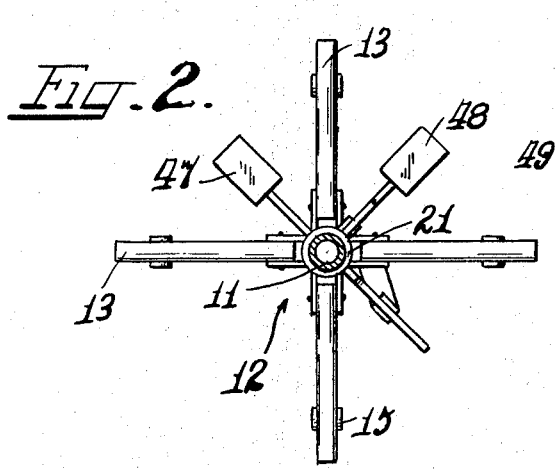
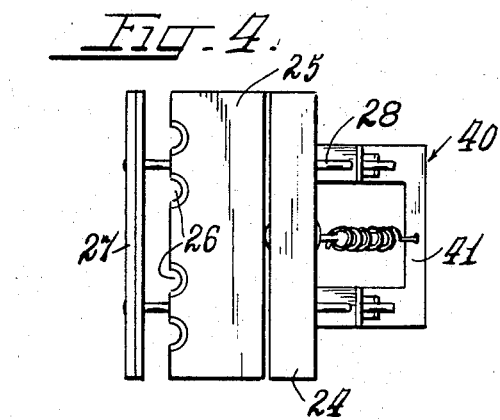
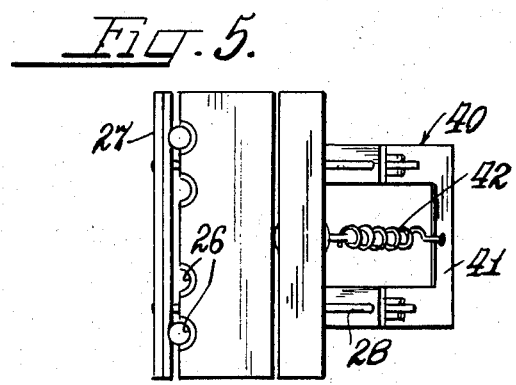
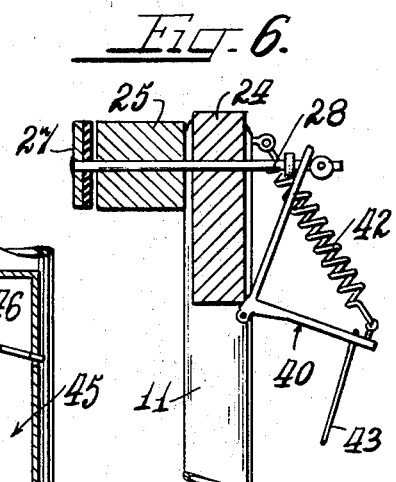
INVENTOR.
Charles J. Hollenbach
BY Loren J. Freund
Martin Faier
Atty.

ANIMAL SUSPENSION RACK

This invention relates to improvements in apparatus for holding an animal suspended while performing an operation on such animal and is particulary concerned with apparatus for holding a pig or other animal suspended by its hind legs while veterinary work is being performed.

The invention contemplates the manual placement of the animal upon rack means that is automatically actuated upon manual manipulation of control elements for clamping the animal firmly by its hind legs and holding it until manually released, without unnecessarily injuring the animal or allowing it to become free from the clamping device. More particularly, the rack means includes an upstanding standard, having a base, and upon the upper end of which is arranged novel clamp means designed to clamp the hind legs of an animal firmly. These means include connections for and a foot pedal to allow locking and unlocking of the clamp means, thus leaving the operator's hands free to handle the animal.

The device also includes a broad base for the standard which is adequate to hold the suspended animal, even under substantial movement, without toppling the standard, and which is foldable to permit the legs of the base to be nested against the standard, as to be convenient for storage when not is use.

It is, therefore, an object of the invention to provide novel rack means for animals.

Another object is to provide novel clamp means to efficiently and safely grasp the hind legs of an animal for holding it suspended.

Another object is to provide novel means to actuate said clamp means.

Another object is to provide a rugged, efficient and inexpensive device of the character referred to herein.

Another object is to provide a suspension rack of the character described herein which may be easily folded for convenient storage.

The structure by means of which the above-noted and other advantages and objects of the invention are obtained will be described in the following specification taken in conjunction with the accompanying drawings, showing a preferred illustrative embodiment of the invention in which:

FIG. 1 is an elevational view of the rack means, showing an animal suspended therefrom.

FIG. 2 is a sectional view showing the base and foot pedals along line 2—2 of FIG. 1.

FIG. 3 is an enlarged sectional view along line 3—3 of FIG. 1 showing the clamp means locking and unlocking device.

FIG. 4 is a top plan view showing the clamping means in open condition.

FIG. 5 is a top plan view showing the clamping means in closed condition, along line 5—5 of FIG. 1.

FIG. 6 is an enlarged sectional view of part of the clamping means showing the bell cranks in operating condition.

Referring now to the exemplary disclosure of one embodiment of the invention as shown in the accompanying drawings, and particularly to FIG. 1, the rack device includes an upstanding standard 11, preferably in the form of a rigid tube supported on a wide foldable base structure 12. Although the base structure may comprise any suitable construction, it preferably is comprised of tubular members including leg members 13 and links 14, each having one end pivotally connected by straps 15 to a related leg and the other end connected by straps 16 to collar 17, which is slideable on the standard and which may be locked in a selected position by pin 18, which may be tied to a link by chain 19, and inserted into a suitable hole 18a through the collar and standard. Each leg 13 is also pivotally connected at one end to a fixed collar 21 on the lower end of standard 11 by strap 20.

The rack device includes novel rack or suspension means arranged at the upper end of standards 11. This means comprises a horizontally disposed block 24 nested firmly within a cutout at the upper end of the standard. Firmly connected to the block is yoke 25, which has a series of laterally spaced recesses 26 on its free edge. These recesses constitute seats into which the hind legs 37 of an animal 30 are positioned manually.

In order to secure the animal suspended with its legs 37 in the recesses 26, there is associated with the yoke 25 a clamp bar 27. As best shown in FIGS. 4 and 5, this clamp bar is connected to the end of a pair of rods 28 which project through the yoke 25 and block 24. The other end of each rod is connected to a bell crank 40, and the bell cranks are connected to a tie bar 41 which is biased toward the upper portion of the block by spring 42 and which is secured to the upper end of a cable 43 connected at its other end to a rod 44. The rod 44 extends downwardly through a clamp assembly 45 (see FIG. 3) which includes a wedge clamp 46, and is connected at its lower and to a treadle 47.

The operation of the wedge clamp assembly 45 is conventional. When the treadle 47 is depressed, the rod 44 is pulled downwardly and it is prevented from returning to its original position by the spring pressed wedge clamp 46. When the rod 44 is in its pulled-down position, the bell cranks 40 are rocked in unison to pull the clamp bar firmly against the animal legs 37 to hold the animal suspended. To release the clamp bars, a second treadle 48 is depressed for pulling the wedge clamp 46 downwardly through a connecting cable 49, whereupon spring 42 connecting tie bar 41 to block 24 returns the clamp bar 27 to its open position.

The inside faces of the clamp bar 27 and the walls of the recesses 26 are lined with resiliently yieldable material, such as sponge rubber, so as to prevent damage to the legs of the suspended animal, while holding the animal firmly secured in the desired position.

Although we have described the preferred embodiment of our invention in considerable detail, it will be understood that the description thereof is intended to be illustrative rather than restrictive, as many details of the structure disclosed may be modified or changed without departing from the spirit or scope of the invention. Accordingly, we do not desire to be restricted to the exact construction described.

We claim:

1. A portable rack for holding an animal in suspended condition comprising:
   a. an upstanding standard;
   b. a clamp element on the upper end of said standard including a yoke having recesses therein adapted to receive the legs of an animal and a clamp bar selectively movable to bear against and hold the legs of said animal in said recesses;
   c. a base on the lower end of said standard;
   d. manual actuated means on said rack including a means connecting said clamp and said manual means for moving the clamp bar into clamping position;
   e. a locking assembly clamp receiving said connecting means for locking the clamp bar in leg engaging position; and
   f. release means on the rack to unlock said clamp assembly to allow the clamp bar to move into unclamping position and open said recesses.

2. The animal suspension rack recited in claim 1, in which the base includes leg portions, a collar slideable along the standard, link portions each pivotally connected to the collar and leg portions, and locking means for securing the collar on the standard and the leg portions in extended position.

3. The animal suspension rack recited in claim 1, in which the clamp element includes rods connected through the yoke to the clamp bar adjacent each recess, and a bell crank secured to the rods movable upon actuation of the manual means for moving the rods in unison through the yoke and closing the clamp bar against the leg of said animal.

4. The animal suspension rack recited in claim 3, in which the opposed faces of the recesses and the clamp bar are covered with resiliently yieldable material.

5. The animal suspension rack recited in claim 3, in which the manual means and lock release means includes a pedal assembly mounted at the lower end of the standard.